United States Patent [19]
Bright

[11] Patent Number: 5,978,970
[45] Date of Patent: Nov. 9, 1999

[54] CROTCH CUSHION FOR A BICYCLE RIDER

[76] Inventor: Patrick Bright, 81 Bear Wallow Rd., Huntly, Va. 22640

[21] Appl. No.: 09/243,371

[22] Filed: Feb. 1, 1999

Related U.S. Application Data

[60] Provisional application No. 60/074,303, Feb. 11, 1998.
[51] Int. Cl.$^6$ ................................................ A41D 1/06
[52] U.S. Cl. ...................................... 2/267; 2/227; 2/467
[58] Field of Search .............................. 2/455, 467, 267,
2/400, 238, 228, 227; 450/97–99; 602/19;
5/653; 297/219.11, 195.1, 195.13, 200,
201, 202, 214

[56] References Cited

U.S. PATENT DOCUMENTS

| | | | |
|---|---|---|---|
| 606,818 | 7/1898 | Best | 297/201 |
| 608,089 | 7/1898 | Wellman | 297/312 |
| 4,132,228 | 1/1979 | Green | 128/33 |
| 4,387,925 | 6/1983 | Barker et al. | 297/201 |
| 4,773,705 | 9/1988 | Terranova | 297/195 |
| 4,961,233 | 10/1990 | Black | 2/228 |
| 5,147,685 | 9/1992 | Hanson | 428/189 |
| 5,271,101 | 12/1993 | Speth et al. | 2/228 |
| 5,522,106 | 6/1996 | Harison et al. | 5/653 |
| 5,823,618 | 10/1998 | Fox et al. | 297/201 |

Primary Examiner—Gloria M. Hale
Assistant Examiner—Tejash Patel
Attorney, Agent, or Firm—Ted Masters

[57] ABSTRACT

A crotch cushion (20) for bicycle riders includes a right buttock seat (22) having a first upwardly facing concave surface (24), and a laterally opposite left buttock seat (26) having a second upwardly facing concave surface (28). An upwardly facing trough (30) is connected between right buttock seat (22) and left buttock seat (26). In a preferred embodiment, padding (40) covers crotch cushion (20). First (24) and second (28) upwardly facing concave surfaces are contoured to accept the lower right and left medial buttocks respectively of a human, and thereby transfer the rider's weight away from the central crotch and onto the buttocks. Trough (30) provides stress relief for the perineal region of a human.

9 Claims, 5 Drawing Sheets

CROTCH CUSHION FOR A BICYCLE RIDER

CROSS REFERENCE TO RELATED APPLICATION

This application claims the filing benefit under 35 U.S.C. §119(3e) of U.S. Provisional Application No. 60/074,303, filed Feb. 11, 1998.

TECHNICAL FIELD

The present invention pertains generally to the field of bicycles, and in particular to a crotch protector which laterally transfers the force exerted on a rider's crotch by a bicycle seat away from the genitalia and perineum and to the lower buttocks.

BACKGROUND ART

Many bicycling enthusiasts wear specially designed cycling pants that are constructed for durability, cushioning between the seat and the cyclist, minimum chaffing of the cyclist, and minimum wind resistance. To distribute and dissipate the pressure, shock, and vibration transmitted by the bicycle seat, the pants typically include a padded liner which is located in the crotch and buttocks regions. For example, U.S. Pat. No. Des. 360,971 shows an anatomical seat pad for cycling shorts. The seat pad is installed in the crotch of the shorts. A fluid layer is located within a shell-like outer layer. U.S. Pat. No. 4,805,243 defines a padded pant construction for athletic purposes. A pants garment has a pad retention member and liner sewn in place within the crotch and lower seat portion of the garment. Lines of stitching define rear and frontal pockets within which are retained resilient pads which cushion muscle and tissue of the anatomy subjacent the pelvis. U.S. Pat. No. 4,961,233 discloses cycling pants wherein the chamois is a single piece of fabric material free of seams and heat-formed to impart a generally form-fitting shape. The chamois has an upwardly extending convex shape. U.S. Pat. No. 5,134,726 portrays sports pants with protective pads. The pants include a trunk and legs formed of elastically stretchable material with pockets in the hip, knee, and crotch areas. U.S. Pat. No. 5,271,101 comprises cycling shorts with an anatomical seat pad. The shorts include a padded seat liner having a plurality of embossed break lines which are specifically positioned such that the liner conforms to the anatomical profile of a cyclist positioned in a riding position on a bicycle. British Patent 976,890 describes protective trousers. The trousers are made of aluminized canvas or a fabric of similar stiffness which is prone to tearing. A plurality of panels are stitched together to form an overlapping front and a joining line of the crotch portion is of smoothly changing contour.

DISCLOSURE OF INVENTION

The present invention is directed to a crotch cushion for use when bicycling. The purpose of the present invention is to lessen the trauma of weight, shock, and vibration bearing directly upon the crotch of the rider during cycling. Through the use of two upwardly-facing buttocks-receiving contoured surfaces, the present invention transfers the rider's weight laterally away from the central crotch (perineum) and outward onto the medial portion of the lower buttocks. The present invention includes an upwardly facing trough or hollowed out groove which is disposed below the perineal region of the human body, and provides stress relief for the pudendal nerves, the perineal arteries, and the prostate. This is extremely useful in helping prevent impotence and prostatitis in men and vaginal desensitization in women. The present invention provides a more ergonomically correct support for the buttocks than does a conventional bicycle seat. The present invention is sewn or otherwise installed in a predetermined location in the crotch of cycling pants. And, the present invention also comes in a variety of sizes which fit into a corresponding variety of cycling pants.

In accordance with a preferred embodiment of the invention, a crotch cushion for use with bicycle seats, comprises right and left buttocks-receiving seats each having an upwardly facing concave surface. A central trough or hollowed out member is located between the two seats, and is shaped to provide stress relief for the perineal region.

In accordance with an important aspect of the invention, a padding covers the crotch cushion.

In accordance with an important feature of the invention, the trough has a downwardly bending mid-portion which is shaped and dimensioned to match the longitudinal contour of the perineum of a human.

In accordance with another important aspect of the invention, the crotch cushion is inserted and retained in place in specially designed cycling pants.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
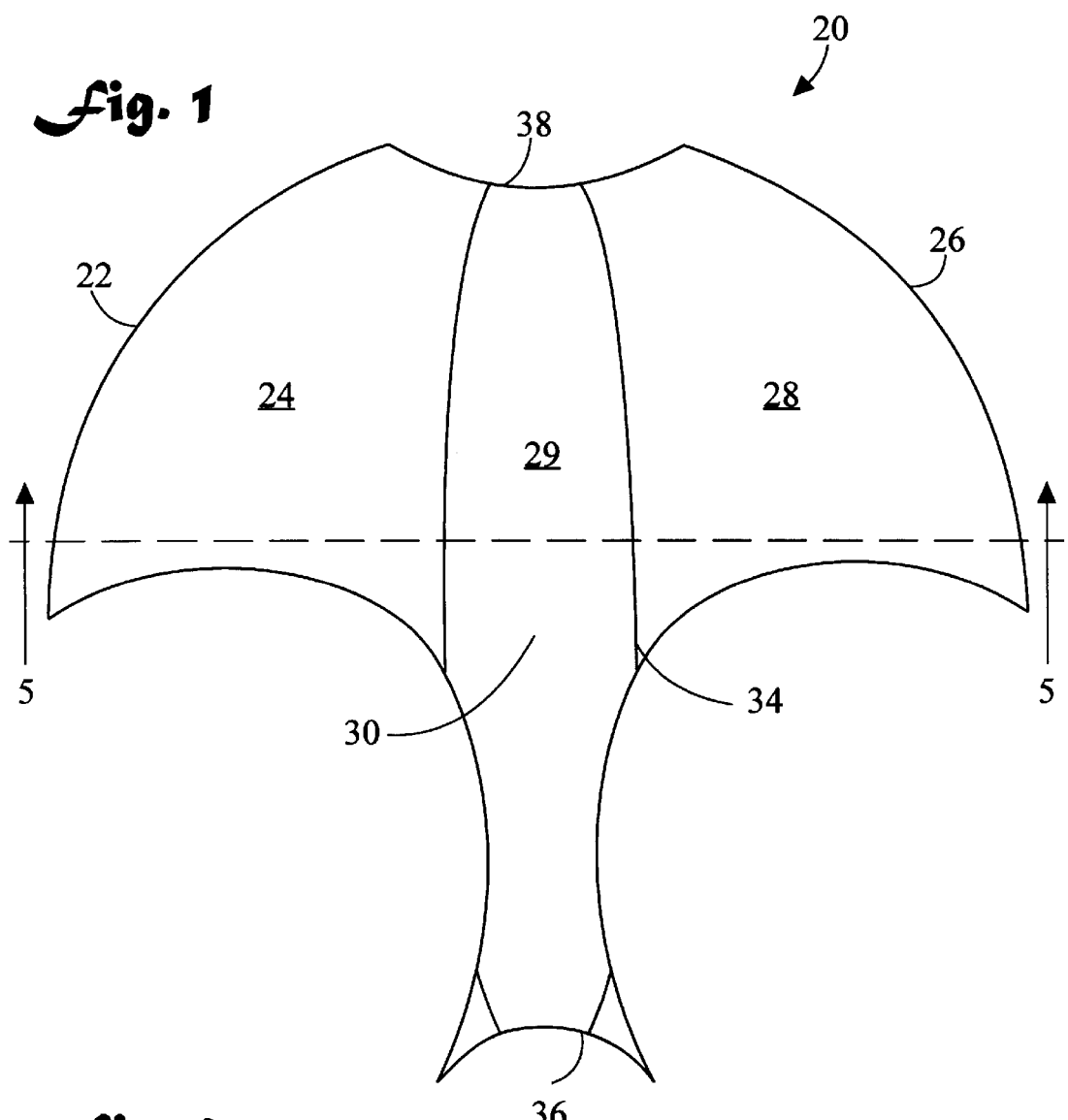
FIG. 1 is a top plan view of a crotch cushion in accordance with the present invention.
Figure 2:
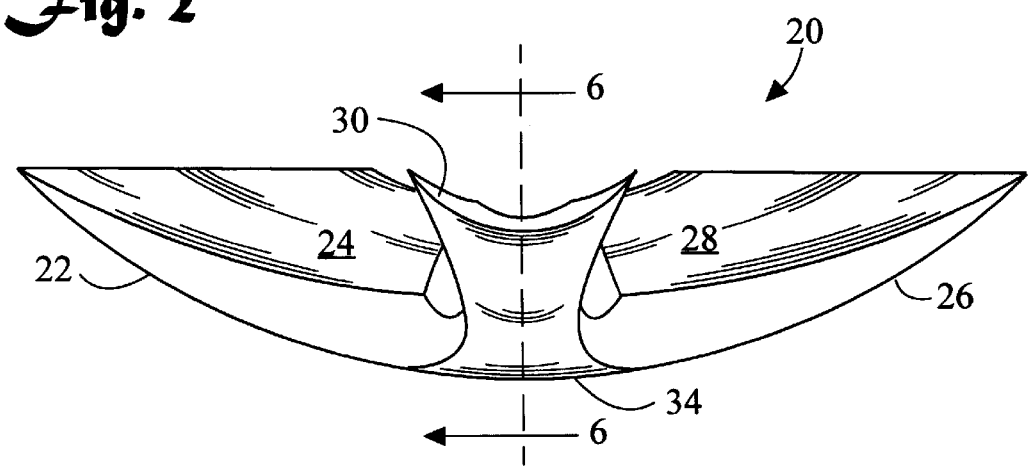
FIG. 2 is a front elevation view of the crotch cushion.
Figure 3:
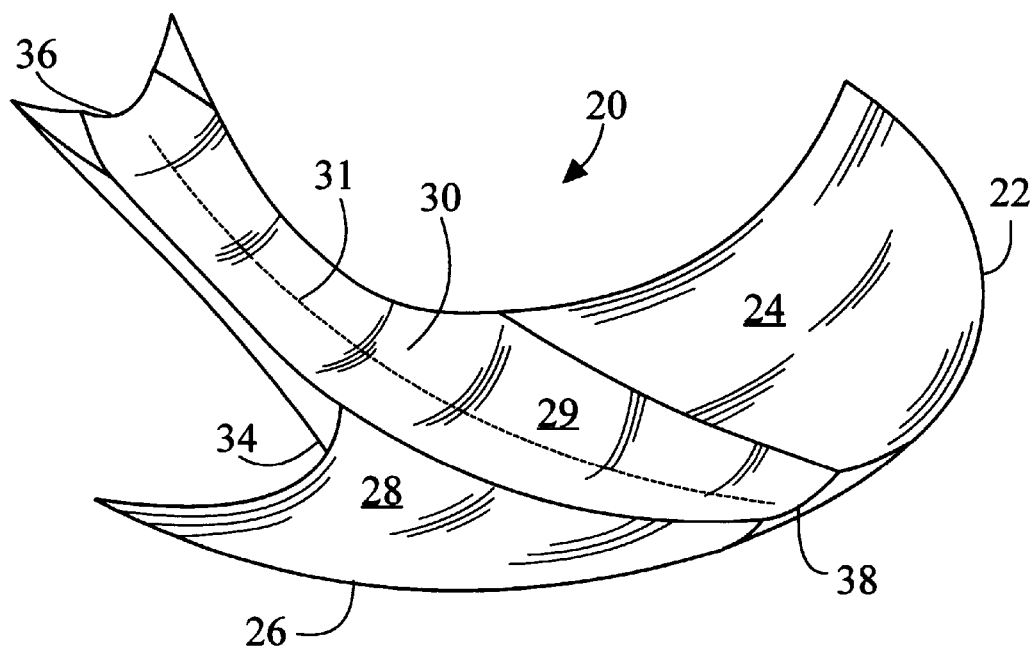
FIG. 3 is a rear perspective view.

Referring initially to FIGS. 1–3 there are illustrated top plan, front elevation, and rear perspective views respectively of a crotch cushion for a bicycle rider in accordance with the present invention, generally designated as 20. Crotch cushion 20 includes a right buttock seat 22 having a first upwardly facing concave surface 24, and a laterally opposite left buttock seat 26 having a second upwardly facing concave surface 28. A trough 30 having a third upwardly facing concave surface 29 is disposed between right buttock seat 22 and the left buttock seat 26. That is, first concave surface 24, second concave surface 28, and third the concave surface 29 are all oriented or face in substantially the same direction. Trough 30 has a curved longitudinal axis 31, with right buttock seat 22 and left buttock seat 26 disposed on opposite sides of axis 31. First 24 and second 28 upwardly facing concave surfaces are contoured to accept the right and left lower medial buttocks of a human respectively, and trough 30 has a downwardly bending mid portion 34 (also refer to FIG. 6) which matches the longitudinal contour of the perineum of a human. That is, longitudinal axis 31 matches the longitudinal contour of the perineum. A very important feature of the invention resides in the fact that trough 30 is shaped to provide stress relief for the perineal region of a human, particularly the pudendal nerves and perineal arteries. That is, as a rider sits on crotch cushion 20, the perineal region resides over the protective cavity of trough 30 and thereby does not experience the pressure, shock, and vibration imparted by the weight of the rider bearing down upon the bicycle seat. The pressure, shock, and vibration is in effect transferred laterally to the lower medial buttocks by virtue of right buttock seat 22 and left buttock seat 26 and their corresponding contoured surfaces 24 and 28. Trough 30 has a front end 36, and opposite rear end 38, with mid-portion 34 therebetween. Right buttock seat 22 and left buttock seat 26 are disposed substantially between rear end 38 and mid-portion 34. That is, in this preferred embodiment, about one half of trough 30 projects outwardly from right buttock seat 22 and left buttock seat 26 thereby forming a tongue-like structure.

Figure 4:
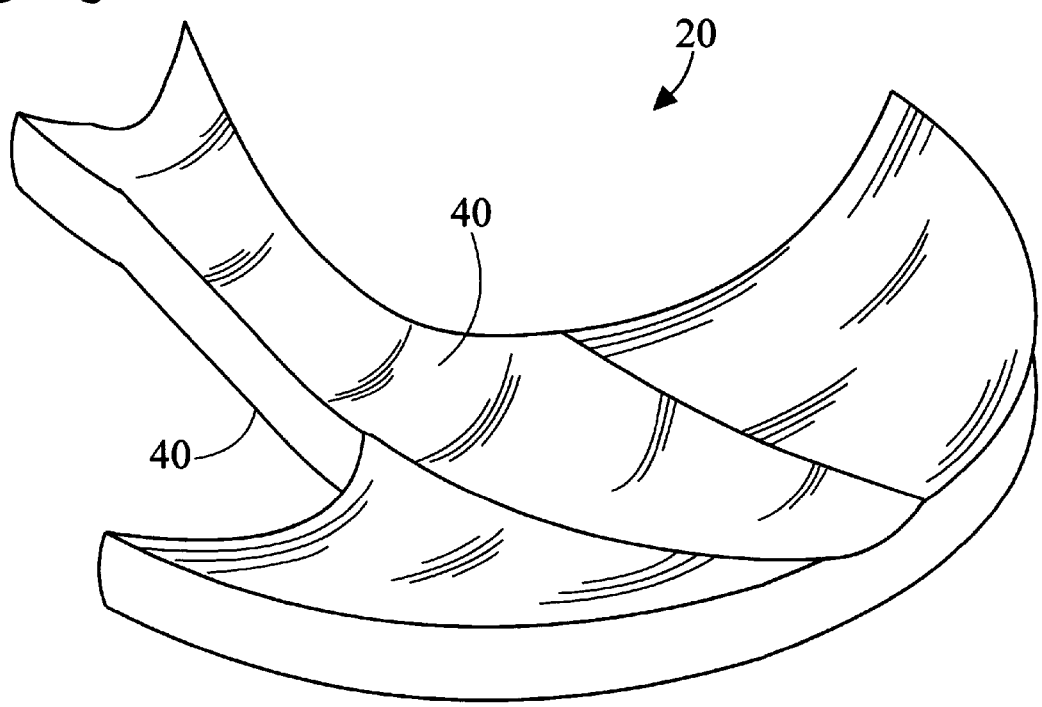
FIG. 4 is a rear perspective view including padding.

FIG. 4 is a rear perspective view of crotch cushion 20 including padding 40 which covers trough 30 and upwardly facing concave surfaces 24 and 28, and also the opposite underside of crotch cushion 20. In a preferred embodiment, padding 40 on the upwardly facing surfaces is about ⅜ thick, while the padding 40 on the underside is about ⅛ thick. Padding 40 serves to provide a cushioning effect to the user, lessens wear and tear on the pants garment 500 (refer to FIG. 7), and also lessens wear and tear to the bicycle seat.

Figure 5:
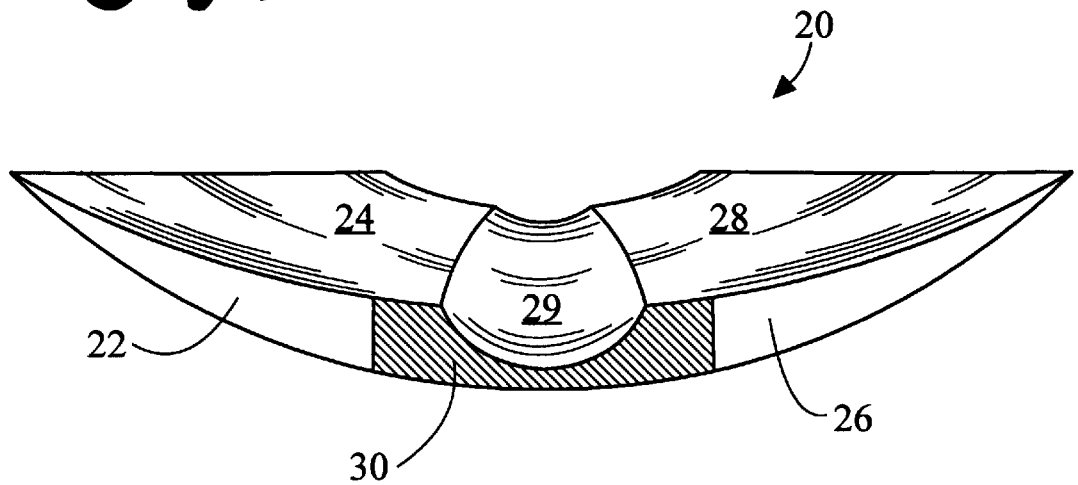
FIG. 5 is a cross sectional view along the line 5—5 of FIG. 1.

FIG. 5 is a cross sectional view along the line 5—5 of FIG. 1 showing right and left buttock seats 22 and 26, first and second concave surfaces 24 and 28, and trough 30.

Figure 6:
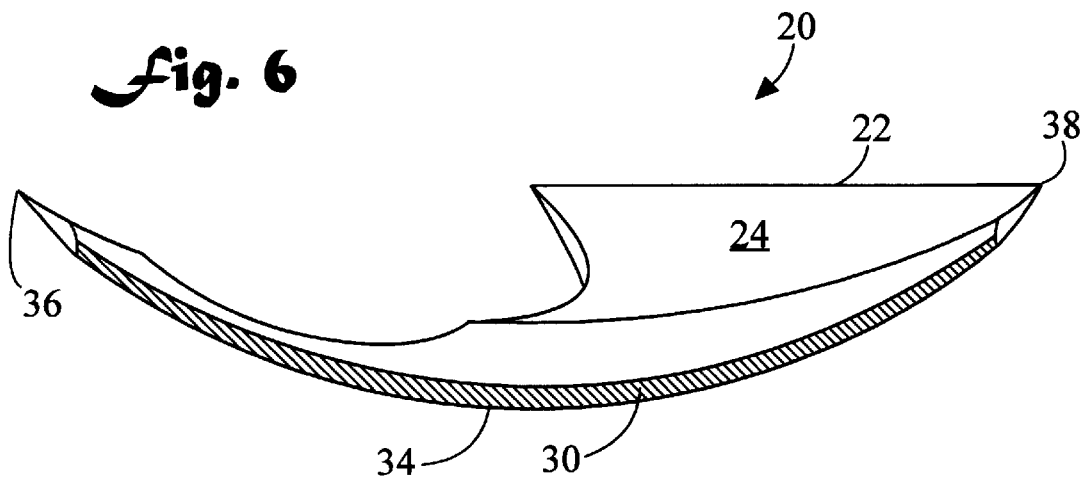
FIG. 6 is a cross sectional view along the line 6—6 of FIG. 2.

FIG. 6 is a cross sectional view along the line 6—6 of FIG. 2, showing right buttock seat 22, first concave surface 24, trough 30, first and second ends 36 and 38, and mid-portion 34.

Figure 7:
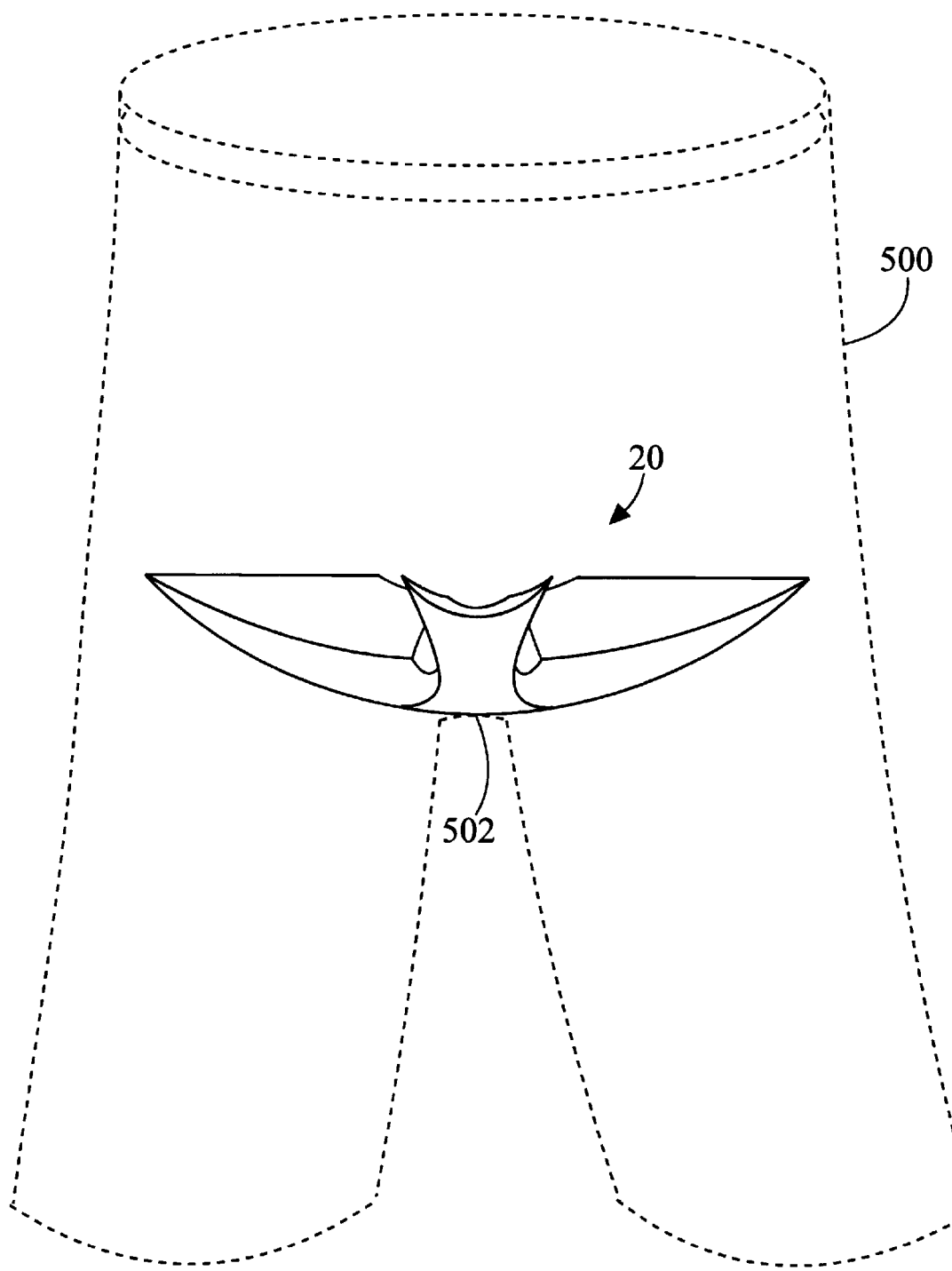
FIG. 7 is a front elevation view of the crotch cushion inserted in cycling pants; and, FIG. 8 is a side elevation view of the crotch cushion inserted in the pants.

FIG. 7 is a front elevation view of crotch cushion 20 inserted in a cycling pants 500. Pants 500 has a crotch and lower seat portion 502. Crotch cushion 20 is disposed in crotch and lower seat portion 502, with pants 500 providing the proper location for crotch cushion 20. Crotch cushion 20 can be permanently sewn, or removably disposed in the pants 500 such as in a specially constructed pocket. Further, both crotch cushion 20 and pants 500 can be fabricated in a plurality of sizes to accommodate different size riders.

Figure 8:
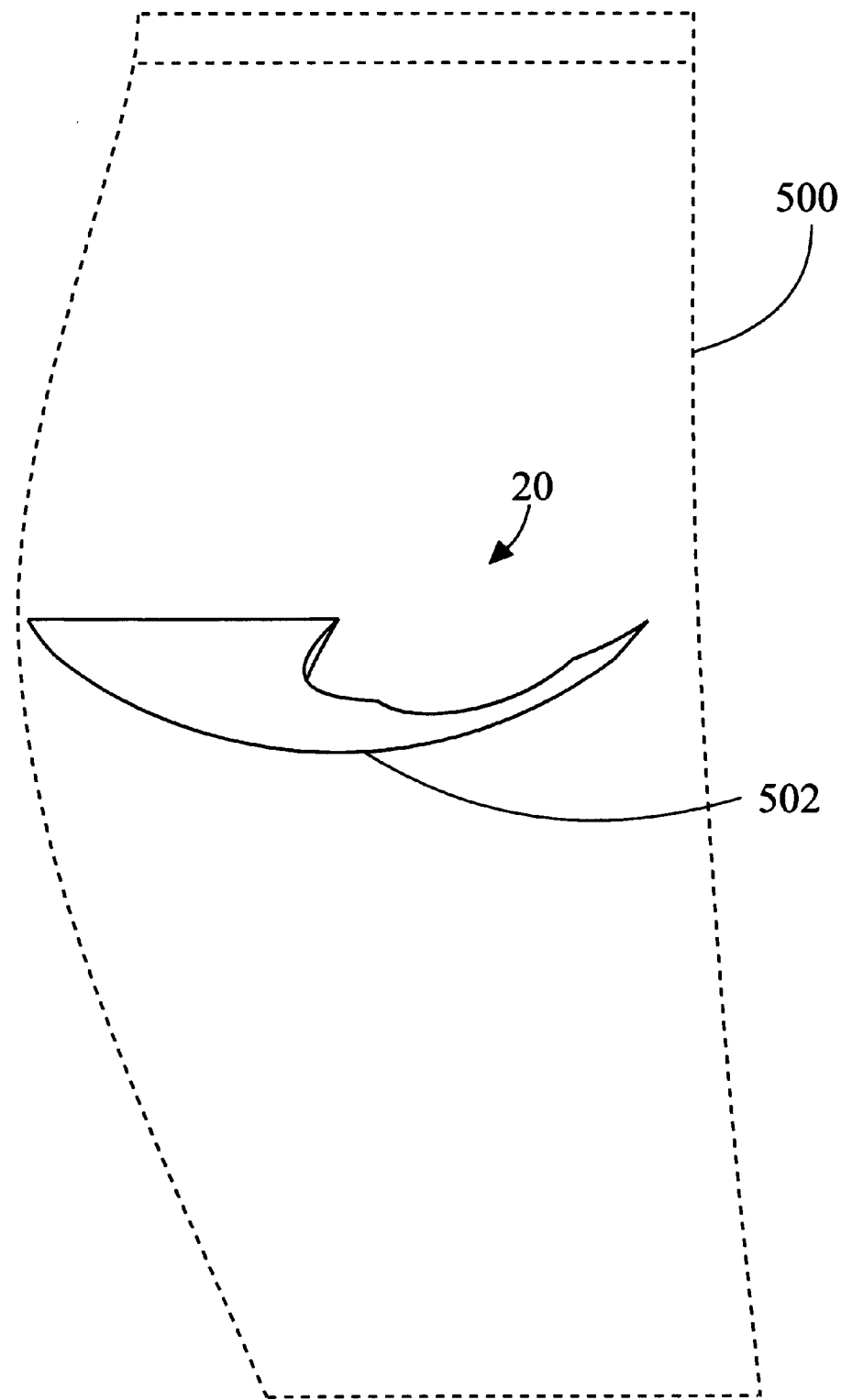

FIG. 8 is a side elevation view of crotch cushion 20 inserted in the cycling pants 500.

Crotch cushion 20 can be fabricated from almost any semi-ridged material that exhibits some degree of flexure. In a preferred embodiment a plastic such as polypropylene is used. Padding 40 can be fabricated from any material having suitable cushioning properties. In a preferred embodiment, padding 40 is fabric.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A crotch cushion for a bicycle rider, comprising:

a right buttock seat having a first concave surface;

a left buttock seat having a second concave surface;

a trough having a third concave surface separating said right buttock seat from said left buttock seat;

said crotch cushion having an underside; and, padding covering said trough, said first and second concave surfaces, and said underside.

2. A crotch cushion for a bicycle rider, comprising:

a right buttock seat having a first concave surface;

a left buttock seat having a second concave surface;

a trough having a third concave surface separating said right buttock seat from said left buttock seat;

said trough having a front end, and opposite rear end, and a mid-portion therebetween; and, said right buttock seat and said left buttock seat disposed substantially only between said rear end and said mid-portion, said trough projecting outwardly from said right buttock seat and said left buttock seat, thereby forming a tongue-like structure.

3. A crotch cushion for cycling pants, said crotch cushion comprising:

a right buttock seat having a first concave surface;

a left buttock seat having a second concave surface;

a trough having a third concave surface separating said right buttock seat from said left buttock seat; and, said crotch cushion installable in the crotch of the cycling pants.

4. A crotch cushion according to claim 3, further comprising:

said crotch cushion either permanently or removably disposed in the cycling pants.

5. Apparel for a bicycle rider, comprising:

pants having a crotch and lower seat portion;

a crotch cushion having a right buttock seat having a first concave surface, a left buttock seat having a second concave surface, and a trough having a third concave surface separating said right buttock seat from said left buttock seat; and, said crotch cushion disposed in said crotch and lower seat portion of said pants.

6. Apparel for a bicycle rider according to claim 5, further including:

said crotch cushion permanently sewn in said pants.

7. Apparel for a bicycle rider according to claim 5, further including:

said crotch cushion removably disposed in said pants such as in a specially constructed pocket.

8. Apparel for a bicycle rider according to claim 5, further including:

said crotch cushion including a right buttock seat, a left buttock seat, and a trough separating said right buttock seat from said left buttock seat;

said trough having a front end, and opposite rear end, and a mid-portion therebetween; and, said right buttock seat and said left buttock seat disposed substantially only between said rear end and said mid-portion, said trough projecting outwardly from said right buttock seat and said left buttock seat, thereby forming a tongue-like structure.

9. Apparel for a bicycle rider according to claim 5, further including:

said crotch cushion having an underside; and, padding covering said trough, said first and second concave surfaces, and said underside.

* * * * *